(12) United States Patent
Christofis et al.

(10) Patent No.: US 6,940,056 B2
(45) Date of Patent: Sep. 6, 2005

(54) INDUCTION HEAT TREATMENT METHOD AND COIL AND ARTICLE TREATED THEREBY

(75) Inventors: Mark Christofis, Troy, MI (US); Rex R. Corless, Sterling Heights, MI (US); Rajendra G. Kumashi, Clarkston, MI (US); William R. Miller, Jr., South Lyon, MI (US); Norman Szalony, Brighton, MI (US); Ted Szczomak, Shelby Township, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 0 days.

(21) Appl. No.: 10/682,611

(22) Filed: Oct. 9, 2003

(65) Prior Publication Data

US 2005/0077289 A1 Apr. 14, 2005

(51) Int. Cl.[7] .................................................. H05B 6/10
(52) U.S. Cl. ......................... 219/635; 219/639; 219/652; 219/672
(58) Field of Search .................................. 219/632, 635, 219/637, 639, 650, 652–653, 656, 662, 672–674, 677; 266/125, 127, 129; 148/510, 567, 572; 475/160, 266; 74/607

(56) References Cited

U.S. PATENT DOCUMENTS

| | | |
|---|---|---|
| 2,157,948 A | 5/1939 | Beeny |
| 2,167,798 A | 8/1939 | Denneen et al. |
| 2,180,038 A | 11/1939 | Denneen et al. |
| 2,236,425 A | 3/1941 | Evleth |
| 2,295,777 A | 9/1942 | Denneen et al. |
| 2,308,240 A * | 1/1943 | Goodridge .................. 219/653 |
| 2,512,893 A | 6/1950 | Gehr |
| 2,689,296 A | 9/1954 | Sabol |

(Continued)

OTHER PUBLICATIONS

Patent application (23 pages) and drawings (4 pages) for U.S. Appl. No. 10/643,362, filed Aug. 19, 2003, entitled "Induction Heat Treatment Method And Coil And Article Treated Thereby," to Christofis et al.

Patent application (24 pages) and drawings (6 pages) for U.S. Appl. No. 10/643,363, filed Aug. 19, 2003, entitled "Induction Heat Treatment Method And Article Treated Thereby," to Christofis et al.

*Primary Examiner*—Tu Hoang
(74) *Attorney, Agent, or Firm*—Dickinson Wright PLLC

(57) ABSTRACT

A method of induction heat treatment of articles having curved outer surfaces, such as differential housings. The method employs a semi-rectangular induction coil that is adapted to provide a plurality of lateral magnetic fields that are used to induce currents in, and thereby provide heat to, a portion of the curved section of the article. The method and induction coil are particularly adapted to provide an induction hardening heat treatment of a curved heat treatment portion of a differential housing. The differential housing was cast from nodular iron. The induction-hardening heat treatment comprised heating the heat treatment portion of the differential housing above the austenite transition temperature and quenching to below the martensite transformation temperature.

29 Claims, 7 Drawing Sheets

U.S. PATENT DOCUMENTS

| | | | |
|---|---|---|---|
| 2,828,119 A | | 3/1958 | Good et al. |
| 2,882,191 A | | 4/1959 | Van Swaal |
| 3,431,379 A | | 3/1969 | Yrene |
| 3,466,023 A | | 9/1969 | Cunningham et al. |
| 3,483,346 A | * | 12/1969 | Frisch et al. ............. 219/639 |
| 3,592,703 A | | 7/1971 | Dehn et al. |
| 3,649,797 A | * | 3/1972 | Vickers ................... 219/639 |
| 3,823,927 A | | 7/1974 | Budzinski |
| 3,842,234 A | | 10/1974 | Seyfried |
| 3,846,609 A | * | 11/1974 | Enk ........................ 219/652 |
| 3,848,107 A | * | 11/1974 | Lewis ..................... 219/672 |
| 4,100,387 A | * | 7/1978 | Reinke et al. ........... 219/639 |
| 4,251,704 A | | 2/1981 | Masie et al. |
| 4,251,707 A | * | 2/1981 | Pusateri et al. ......... 219/673 |
| 4,251,709 A | | 2/1981 | Schumacher |
| 4,677,876 A | | 7/1987 | Dissett |
| 4,728,761 A | * | 3/1988 | Mucha et al. ............ 219/639 |
| 4,751,853 A | * | 6/1988 | Dissett .................... 475/226 |
| 4,785,147 A | | 11/1988 | Mucha et al. |
| 4,808,779 A | | 2/1989 | Cogley |
| 4,828,227 A | | 5/1989 | Georges et al. |
| 4,855,551 A | | 8/1989 | Mucha et al. |
| 4,855,556 A | | 8/1989 | Mucha et al. |
| 4,894,501 A | | 1/1990 | Pfaffmann et al. |
| 5,213,636 A | | 5/1993 | Akers et al. |
| 5,218,178 A | | 6/1993 | Peysakhovich |
| 5,414,246 A | | 5/1995 | Shapona |
| 5,495,094 A | | 2/1996 | Rowan et al. |
| 6,139,462 A | | 10/2000 | Gage et al. |
| 6,274,857 B1 | | 8/2001 | Loveless et al. |
| 6,315,841 B1 | | 11/2001 | Fisher et al. |

* cited by examiner

INDUCTION HEAT TREATMENT METHOD AND COIL AND ARTICLE TREATED THEREBY

FIELD OF THE INVENTION

The present invention relates to a method of induction heat treatment. More specifically, the invention comprises a method for induction hardening certain metal components, particularly those having a curved outer surface. Most particularly, the invention comprises a method for induction hardening a cast nodular iron differential housing.

BACKGROUND OF THE INVENTION

Induction heat treatment is known to be an effective method of case hardening certain nodular iron alloys. However, the use of induction hardening for nodular iron components has been limited in cases where the portions of the component requiring heat treatment cannot be uniformly heated with an induction coil of conventional design, such as a cylindrical coil, perhaps due in part to the complex microstructural balances required as well as the difficulty associated with designing induction coils to provide the necessary heating of irregularly shaped surfaces. While some solutions have been proposed to facilitate the use of induction hardening with articles having irregular surfaces, such as the use of different coils and different induction frequencies to treat different portions of the surface, or the use of coil designs that are adapted to the contour of the irregularities in order to provide more uniform inductive coupling, induction hardening has not been used for various types of components, such as those described below.

Nodular iron is widely used to cast various components, including various housings used in automotive vehicles. For example, nodular iron is commonly used to make a variety of differential housings, which are used to house the differential gears for rear wheel drive vehicles. Because it is widely used in this application, nodular iron differential housings are manufactured in relatively high volumes. Nodular iron differential housings typically have bell-shaped outer surfaces extending along a longitudinal axis, while the internal housing portion is frequently spherical or partially spherical and adapted to house a differential gear set. The open end of the bell-shaped surface frequently incorporates a flange that is adapted to receive a ring gear, which in turn transitions to a lower hub at the lower end of the housing that is adapted to receive an axle shaft. The closed end of the bell-shaped surface also frequently transitions to an upper hub that is adapted to receive an axle shaft. All of these features are typically cast at once as what may be described as a single wall or sidewall. The bell-shaped surface also frequently includes opposed front and rear openings which extend through the sidewall of the housing into the internal housing portion. These openings may be cast into the housing, or as is frequently the case, machined while the castings are still warm from the casting process.

In addition to housing the differential gear set, a primary function of the differential housing is to transmit torque from the drive train to the drive wheels through the differential gears. As a result, differential housings typically have rigorous metallurgical and mechanical requirements. As the torque capacity requirements for a particular differential housing design are increased, the mechanical and metallurgical requirements for that housing design are also increased. As these requirements are increased, Applicants have observed that they occasionally exceed the torque handling capacity of the housing, leading to fracture of the housing in the area having the lowest torque handling capacity. This is typically in a region adjacent the front and rear openings as described above, and more specifically between the openings and the upper hub.

Increased capacity can be accomplished by increasing the size of the housing, but it is frequently desirable to maintain or reduce the size of the housing while also increasing its torque handling capacity.

Therefore, it is desirable to develop a method of heat treatment that addresses the limitations mentioned above and that provides a method for surface or case hardening parts having an irregular surface, such as a differential housing, in a specific region of the surface, whereby the torque handling capacity of a given differential housing design may be increased while maintaining the size of the housing, or potentially enabling a reduction in the size of the housing.

SUMMARY OF THE INVENTION

The present invention provides a method of induction heat treatment, comprising the steps of: selecting an article for heat treatment comprising a metal wall having an upper hub portion, a lower hub portion, a bell-shaped portion that is located between the upper hub portion and the lower hub portion and a longitudinal axis extending through each of the upper hub portion, lower hub portion and bell-shaped portion, the bell-shaped portion having a bell-shaped outer surface, an inner surface and a plurality of windows extending from the outer surface to the inner surface; selecting an induction coil comprising a hollow metal channel having a first termination portion, a second termination portion and a semi-rectangular inductor portion that is operably connected to the first termination portion and the second termination portion; wherein the inductor portion is adapted to receive the article and apply a plurality of magnetic fields to a heat treatment portion thereof; placing the article within the inductor portion of the induction coil; rotating the article within the induction coil at a selected speed; energizing the induction coil to apply the magnetic fields and produce induction currents within the heat treatment portion of the article for a time sufficient to induce heating of the heat treatment portion to a heat treatment temperature ($T_H$) to at least a selected case depth; and cooling the heat treatment portion of the article to a temperature ($T_C$) to the selected case depth.

The invention also comprises a differential housing comprising a metal wall having an upper hub portion, a lower hub portion, a bell-shaped portion that is located between the upper hub portion and the lower hub portion, a longitudinal axis extending through each of the upper hub portion and a circumferential hardened case, the bell-shaped portion having a bell-shaped outer surface, an inner surface and a plurality of windows extending from the outer surface to the inner surface, the circumferential hardened case extending inwardly from the bell-shaped outer surface in a heat treatment portion which is located between the window and the upper hub, wherein the hardened case is formed by an induction heat treatment.

The invention also comprises an induction coil comprising: a hollow metal channel comprising a first termination portion, a second termination portion, and a semi-rectangular inductor portion that is operably connected to the first termination portion and the second termination portion.

This method provides a significant increase in the strength of nodular cast iron articles treated thereby without having to alter the geometry of the article. The process also minimizes any kind of grain growth or distortion of the article associated with more conventional methods of heat-treating. This process eliminates heat-treating of the entire part thus minimizing and controlling distortion that can adversely affect assembly and functionality of the finished product.

The present invention undertakes to improve the production of such components by enabling the use of induction hardening, and thereby providing better control over the process by hardening one component at a time, improving the metallurgical and mechanical properties of the components, and allowing for a reduction in heat treatment cost.

The hardening operation will be simplified, and allow improved control, by the application of this invention because the components will be processed one at a time. The integration of the part location, heating, and quenching functions into a single, robust machine simplifies the heat treatment operation compared to previous methods by reducing the part handling requirements and reducing complex cycle parameters (e.g. adjusting the entire process for part-to-part variations in a batch of parts due to different temperature and environmental conditions that exist in a large heat treating furnace) to a small set of control parameters for each individual part (e.g. power, induction time, quench flow rates, etc.). Enabling the automatic control of process variables, such as the power level, total power delivered, quench temperature, quench flow rate, and cycle timing parameters, along with other process variables, will enable improved process control.

The mechanical properties of the components may also be improved by the selective application of heat in only the areas where high hardness is desired to give more precise control over the hardness and strength of the critical areas of the article.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

Figure 1:
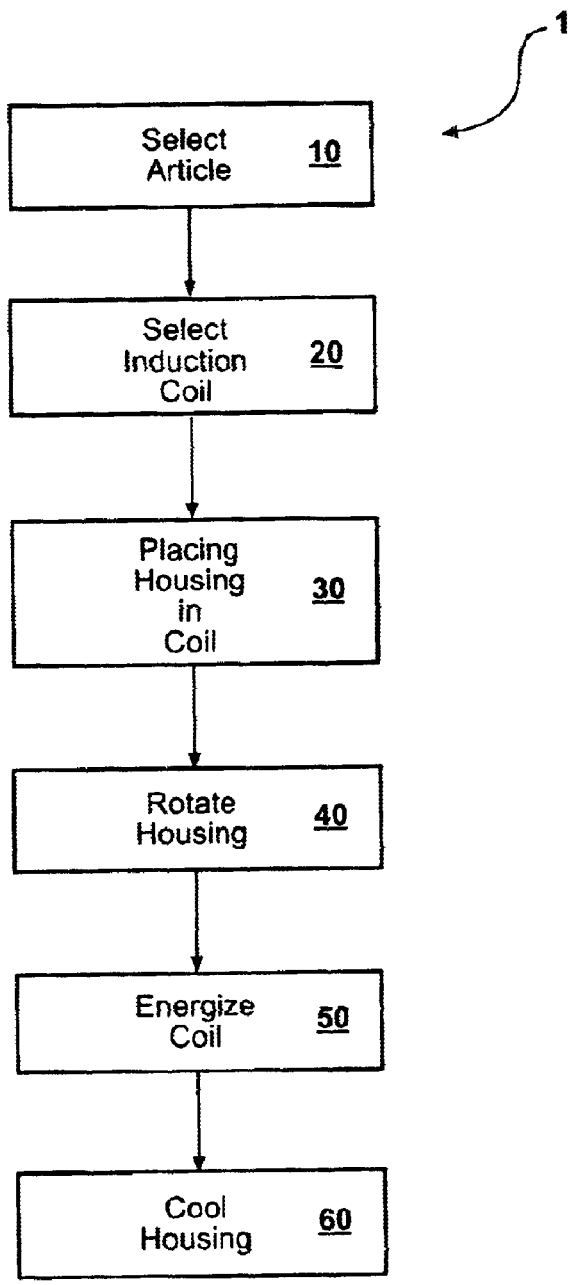
FIG. 1 is a flow diagram illustrating the method of the invention.

Referring to FIGS. 1–13, the present invention comprises a method 1 of induction heat treatment. Method 1 comprises the steps of: selecting 10 an article 100 for heat treatment, such as differential housing 200, comprising a metal wall 205 having an upper hub portion 210, a lower hub portion 215, a bell-shaped portion 220 that is located between the upper hub portion and the lower hub portion and a longitudinal axis 225 extending through each of the upper hub portion 210, lower hub portion 215 and bell-shaped portion 220, the bell-shaped portion 220 having a bell-shaped outer surface 230, an inner surface 235 and a plurality of windows 240 extending from the outer surface to the inner surface; selecting 20 an induction coil 300 comprising a hollow metal channel 305 having a first termination portion 310, a second termination portion 315 and a semi-rectangular inductor portion 320 that is operably connected to the first termination portion 310 and the second termination portion 315; wherein the induction coil 300 is adapted to receive the article 100, such as differential housing 200, and apply a plurality of magnetic fields to a heat treatment portion 245 thereof; placing 30 the article 100 within the inductor portion of the induction coil 300; rotating 40 the article 100 within the induction coil 300 at a selected speed; energizing 50 the induction coil 300 to apply the magnetic fields and produce induction currents within the heat treatment portion 245 of the article 100 for a time sufficient to induce heating of the heat treatment portion 245 to a heat treatment temperature ($T_H$) to at least a selected case 250 depth; and cooling 60 the heat treatment portion 245 of the article 100 to a temperature ($T_C$) to the selected case 250 depth. The method 1 of heat treatment, article 100, differential housing 200 and induction coil 300 are described more particularly below.

Figure 2:
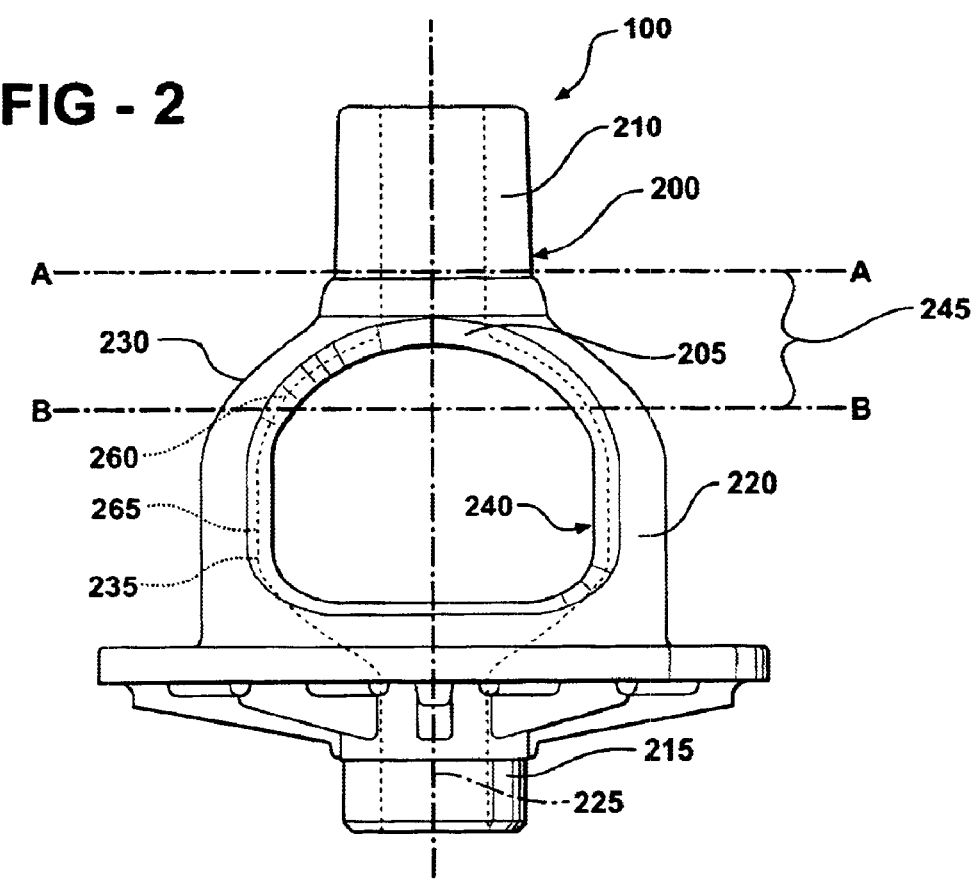
FIG. 2 is a side view of an article of the present invention in the form of a differential housing.
Figure 3:
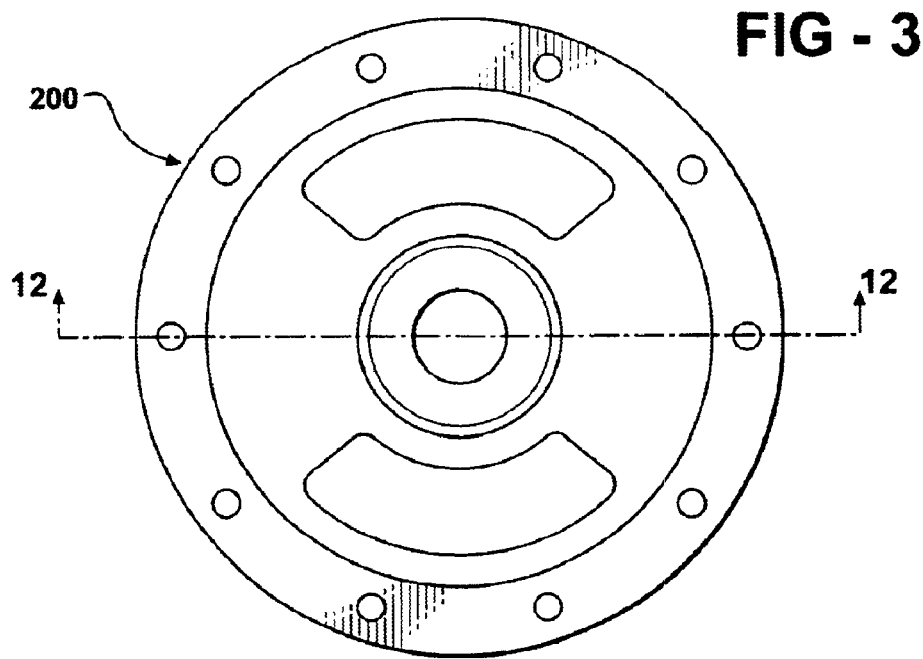
FIG. 3 is a top view of the differential housing of FIG. 2.
Figure 4:
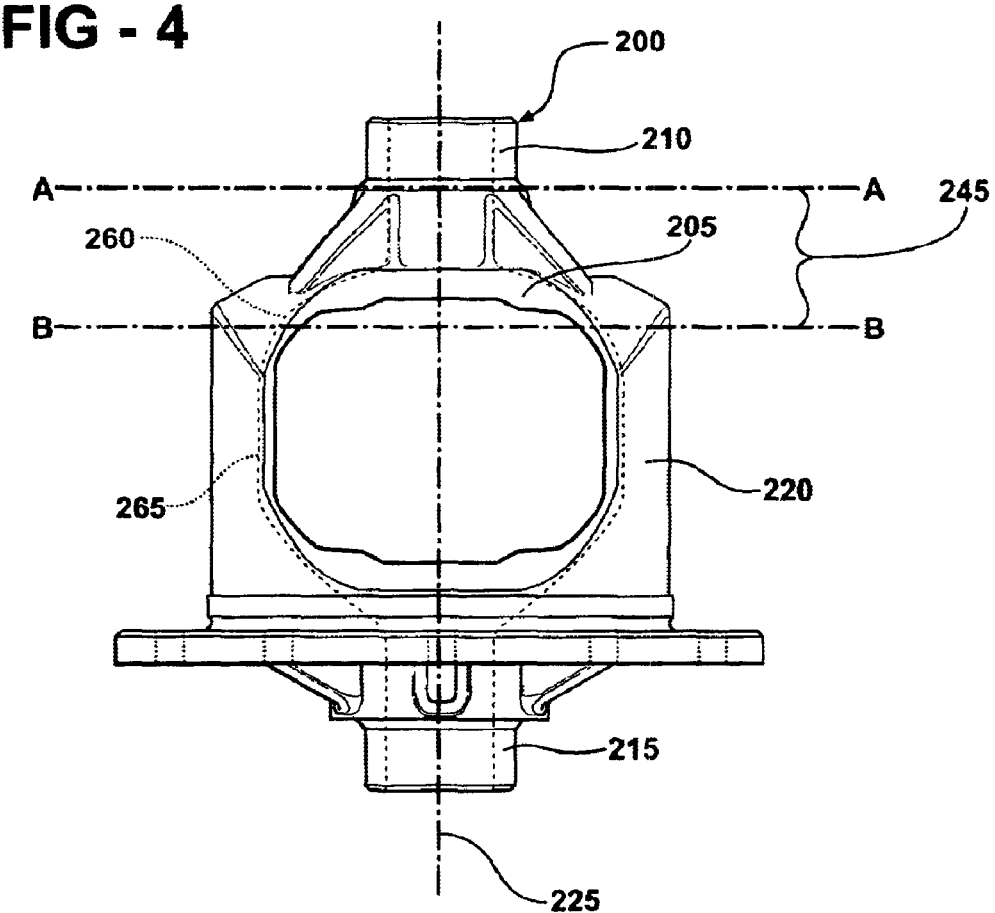
FIG. 4 is a side view of an article of the present invention in the form of a second differential housing.
Figure 5:
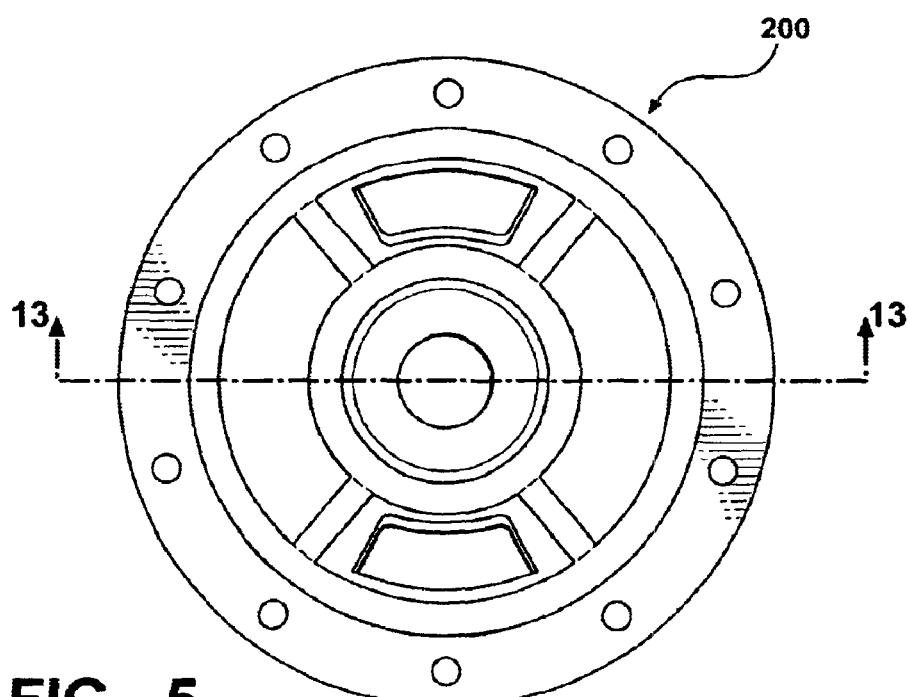
FIG. 5 is a top view of the differential housing of FIG. 4.

With regard to the step of selecting 10 an article 100, this method of induction heat treatment is ideally suited for the induction heat treatment of articles having a curved outer surface, such as differential housing 200, as shown in FIGS. 2–4. Preferably, article 100, such as differential housing 200, comprises a metal wall 205 having an upper hub portion 210, a lower hub portion 215, a bell-shaped portion 220 that is located between upper hub portion 210 and lower hub portion 215 and longitudinal axis 225 extending through each of upper hub portion 210, lower hub portion 215 and bell-shaped portion 220. Bell-shaped portion 220 has a bell-shaped outer surface 230, and inner surface 235 comprising a generally spherical upper portion 260 and a generally cylindrical lower portion 265 and a plurality of windows 240. Metal wall 205 preferably comprises cast nodular iron, such as may be defined by specifications or standards such as ASTM A536-84, ASTM A395-80, ASTM A476-82, A476-84, ASME SA395, ASME SA476, SAE J434c and Mil-1-24137. Metal wall 205 is typically formed by casting using well-known casting methods, such as sand casting, such that upper hub portion 210, lower hub portion 215, and bell-shaped portion 220 are all formed simultaneously as a single wall. As-cast nodular iron has a characteristic microstructure comprising a matrix that is a mixture of varying proportions of ferrite and pearlite with nodules of graphite distributed therein. Preferably, the graphite nodules are spheroidal. As the amount of pearlite increases, the strength and hardness of the iron also increases. The differential housings 200 shown in FIGS. 2 and 4 have somewhat different designs, but share many of the same features. As such, they have been numbered using the same reference numerals to illustrate the common features and to illustrate how the present invention may be applied to articles 100, such as differential housings 200, that are of somewhat different design.

Referring to FIGS. 2 and 4, empirical evidence as well as structural analysis suggests when a torque load is applied to differential housing 200, that the region of highest stress, and thus the highest likelihood of fracture as the torque load on differential housings 200 is increased, lies within the shoulder of the housing 200 adjacent to the top of windows 240, represented in FIGS. 2 and 4 as the region between lines A—A and B—B. Therefore, in order to achieve higher torque load capacity in a housing of a given size, it is desirable to strengthen and toughen this region by induction heat treatment. This region may be referred to as heat treatment portion 245. It is preferred that the microstructure within heat treatment portion 245 comprise a matrix that is substantially tempered martensite, with spheroidal nodules of graphite distributed therein. By substantially tempered martensite, it is meant that the matrix may contain some softer microstructural products, such as ferrite and pearlite, but that the largest weight fraction of the matrix should be tempered martensite, and preferably substantially all of the matrix should comprise tempered martensite. It is also preferred that the induction heat treatment avoid any substantial solutionizing of the graphite nodules in heat treatment portion 245, as it is known that any substantial solutionizing of the graphite nodules will reduce the strength and toughness of the associated portion of the microstructure.

Figure 6:
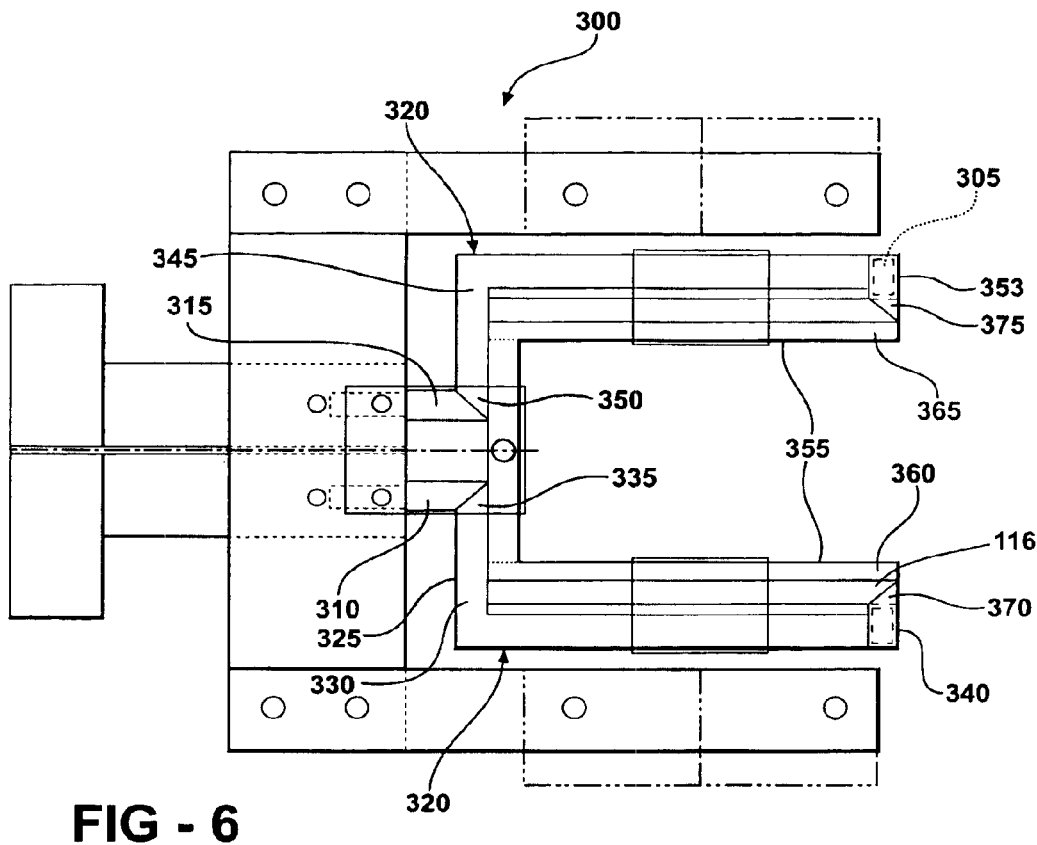
FIG. 6 is a top view of an induction coil of the present invention.
Figure 7:
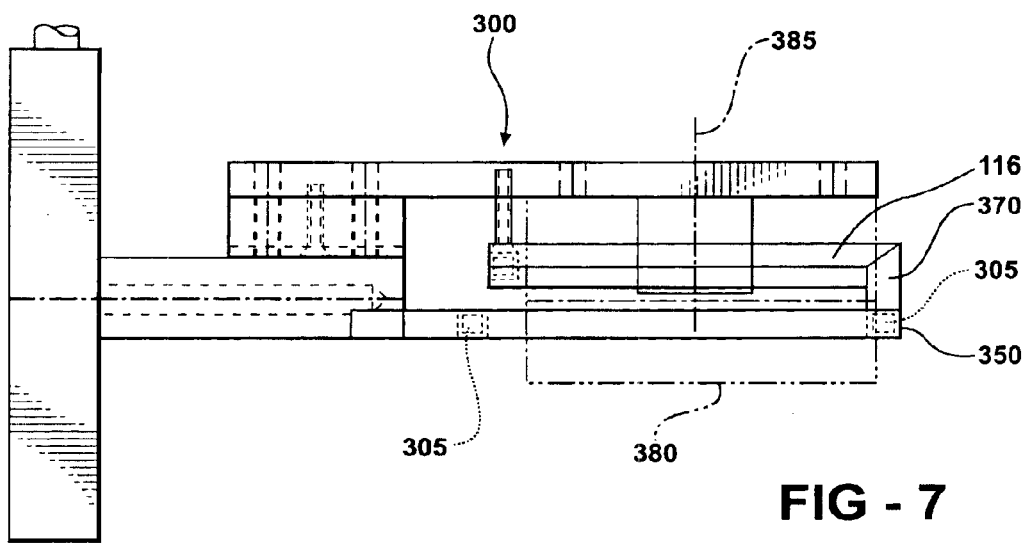
FIG. 7 is a side view of the induction coil of FIG. 6.
Figure 8:
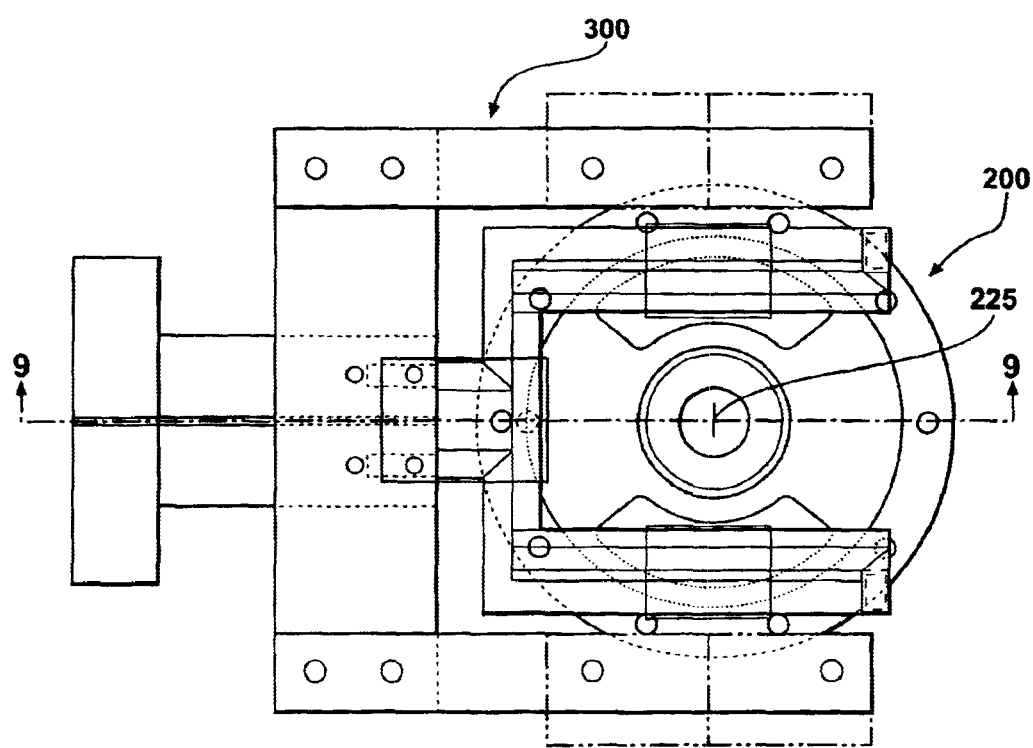
FIG. 8 is a top schematic view illustrating a differential housing placed within an induction coil according to the method of the invention.
Figure 9:
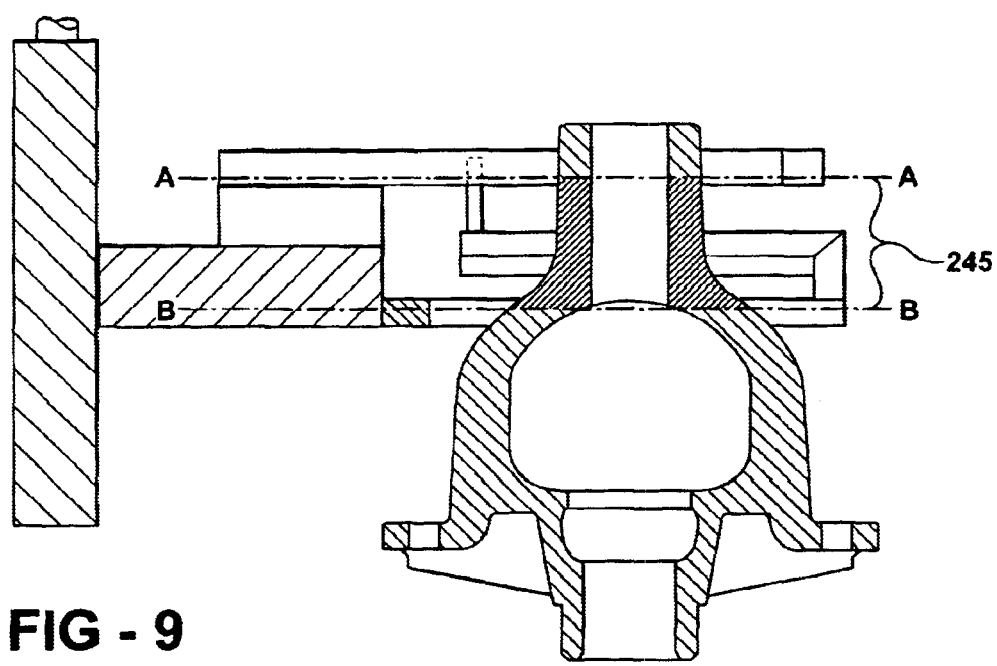
FIG. 9 is a cross-sectional view of section 9—9 of FIG. 8.
Figure 10:
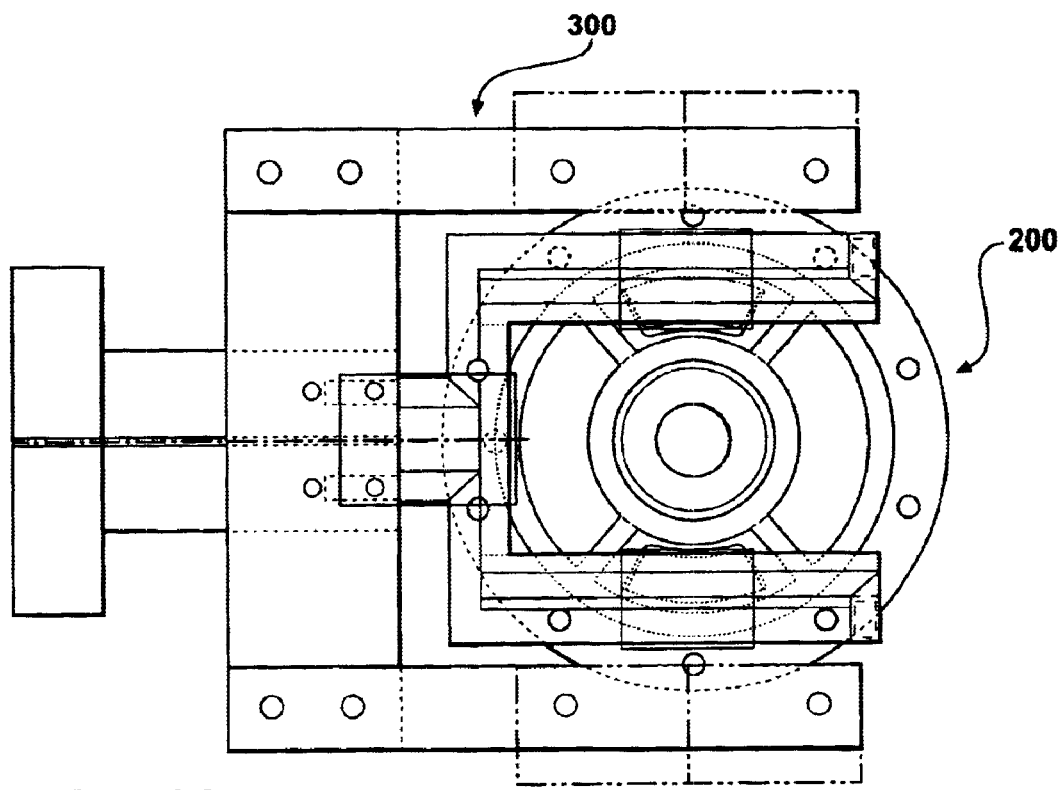
FIG. 10 is a top schematic view illustrating a second differential housing placed within an induction coil according to the method of the invention.
Figure 11:
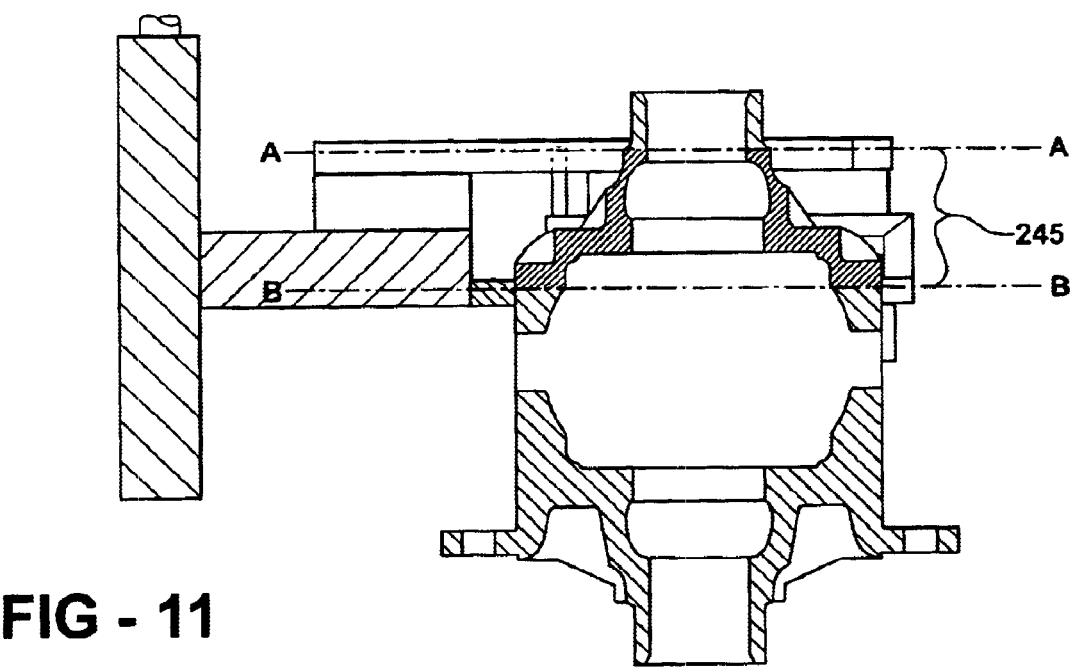
FIG. 11 is a cross-sectional view of section 11—11 of FIG. 10.

Referring to FIG. 1, having selected 10 article 100, such as differential housing 200, method 1 comprises the additional step of selecting 20 an induction coil 300. Referring to FIGS. 6 and 7, induction coil 300 comprises a hollow metal channel 305 having a first termination portion 310, a second termination portion 315, and a semi-rectangular inductor portion 320 that is operably connected to the first termination portion 310 and the second termination portion 315. The semi-rectangular inductor portion 320 comprises a semi-rectangular lower coil portion 325 comprising a first L-shaped section 330 having a first termination end 335, that is connected to the first termination portion 310, and a first lower lateral end 340, and an opposed second L-shaped section 345 having a second termination end 350, that is connected to the second termination portion 315, and a second lower lateral end 353; a semi-rectangular upper coil portion 355 having a first upper lateral end 360 and a second upper lateral end 365, and that is located above and is proportionately smaller than the lower coil portion 325; a first lateral portion 370 that connects the first lateral end 360 of the upper coil portion 355 to the first lateral end 340 of the lower coil portion 325, and a second lateral portion 375 that connects the second lateral end 365 of the upper coil portion 355 to the second lateral end 353 of the lower coil portion 325. The heating of article 100 is primarily provided by magnetic fields produced by first lateral portion 370 and second lateral portion 375, and the respective ends of upper coil portion and lower coil portion when induction coil 300 is energized. Both upper coil portion 355 and lower coil portion 325 must be sized so as to receive article 100, such as differential housing 200, without interference while maintaining close proximity to permit coupling of the magnetic fields produced by first lateral portion 370, second lateral portion 375 and the respective ends of upper coil portion 355 and lower coil portion 325 to the surface of article 100. In the case of differential housing 200, the spacing was about 13 cm. The spacing of upper coil portion 355 and lower coil portion 325, and the respective lengths of first lateral portion 370 and second lateral portion 375 must be adapted depending on the design of differential housing 200 and the desired length or size of heat treatment portion 245.

As shown in FIGS. 6 and 7, first termination portion 310 and second termination portion 315 are adapted to connect inductive coil 300 to a power supply (not shown). While the arrangement of elements is provided to illustrate an embodiment of induction coil 300, the coil is not limited to the particular embodiment shown. For example, first termination portion 310 and second termination portion 315 could possibly also be incorporated into upper coil portion 355 rather than lower coil portion 325, with a corresponding rearrangement of the other elements of induction coil 300. Referring again to FIGS. 6 and 7, induction coil 300 may comprise any suitable size, cross-sectional shape and composition, depending on the exact nature of article 100 that is to be used therewith. However, in the case of differential housing 200, the spacing of the first and second upper lateral ends 360 and 365 of upper coil portion 355 was about 13 cm and comprised a hollow, rectangular, 99% copper tube 116 having an external width of 10 mm and an external height of 10 mm, and sidewall thickness of 1.1 mm. Induction coil 300 must be adapted so as to receive article 100, while preferably maintaining as close a spacing as is practicable, so as to maximize the inductive coupling with article 100 when induction coil 300 is energized, and yet not interfere with the rotation of article 100, as discussed herein. Induction coil 300 is preferably adapted so that longitudinal axis 225 of article 100 may be easily aligned to be parallel to and coincident with longitudinal axis 385. Induction coil 300 also preferably comprises quench blocks 380 as shown in phantom in FIGS. 6 and 7. Quench blocks 380 are connected to known means for providing a quenchant, such as a storage tank or supply line, and includes a plurality of openings through which quenchant may be sprayed onto article 100, as described below.

Referring to FIGS. 1 and 8–11, the next step of method 1 comprises placing 30 the heat treatment portion 245 of article 100, such as differential housing 200, within the induction coil 300. Placing 30 comprises providing a rotatable means for placing and rotating article 100 and performing the subsequent steps of method 1. As discussed above and illustrated in FIGS. 8–11 with regard to differential housing 200, housing 200 is preferably placed within induction coil 300 so that its longitudinal axis 225 is parallel to and coincident with longitudinal axis 385 of induction coil 300. Heat treatment portion 245 is placed adjacent to induction coil 300, such that the magnetic field produced when induction coil 300 is energized is inductively coupled to heat treatment portion 245. Differential housing 200 may be placed into induction coil 300 by any number of suitable known means for holding and rotating differential housing 200, such as a rotatable jig or fixture. It is also preferable that means for holding and rotating differential housing 200 be selected so as to minimize any interference with the magnetic fields generated by induction coil 300.

Referring to FIG. 1, the next step of method 1 comprises rotating 40 differential housing 200 within induction coil 300 at a selected speed. This speed may be any suitable speed and may comprise a variable speed during or within the subsequent steps of method 1. Rotation is used to compensate for the fact that induction coil 300 has a region where first termination portion 310 and second termination portion 315 join semi-rectangular inductor portion 320 where the resultant magnetic field is non-uniform and generally reduced as compared to adjacent sections of induction coil 300. In the case of the application of method 1 to differential housing 200 as described herein, the rotational speed was between 20 to 100 rpm.

Referring to FIG. 1, the next step of method 1 comprises energizing 50 the induction coil 300 to a selected energy level to apply the magnetic field and produce an induction current within heat treatment portion 245. In the case of nodular iron, such as SAE D-5506, to provide induction hardening, this energizing 50 must be performed for a time sufficient to induce heating of heat treatment portion 245 to a heat treatment temperature ($T_H$) to at least a selected case 250 depth, such as the required or desired hardened case 250 depth. For differential housing 200, it is preferred that the case 250 extend through the entire thickness of metal wall 205 within heat treatment portion 245. For differential housing 200, and induction coil 300, the step of energizing 50 comprised applying power from a commercially available power supply of a type used for induction heat treatment in a range of about 1.0 kHz, and for about 6–12 seconds. In the case of differential housing 200, this step of energizing 50 was sufficient to heat the entire thickness of heat treatment portion 245 to a temperature that was above the austenite transition temperature. The austenite transition temperature for the nodular iron compositions noted herein is about 1600–1900° F. It will be readily understood that the inductive frequency and power can be altered depending on the size, shape, composition and other factors associated with differential housing 200, the specific design of inductor coil 300, as well as other factors.

The next step of method 1 comprises cooling 60 heat treatment portion 245 of article 100. Cooling 60 comprised quenching heat treatment portion 245 in an aqueous quenchant comprising 3–5% Aqua Quench 251 for a time sufficient to heat treatment portion 245 to approximately 150–100° F. below $T_C$. Quenching was accomplished by pumping a large volume of the quenchant through a plurality of holes in quench block 380 onto heat treatment portion 245. In the case of differential housing 200, the quench time was about 10–15 seconds. The quenchant flow rate was about 15–25 gpm.

Figure 12:
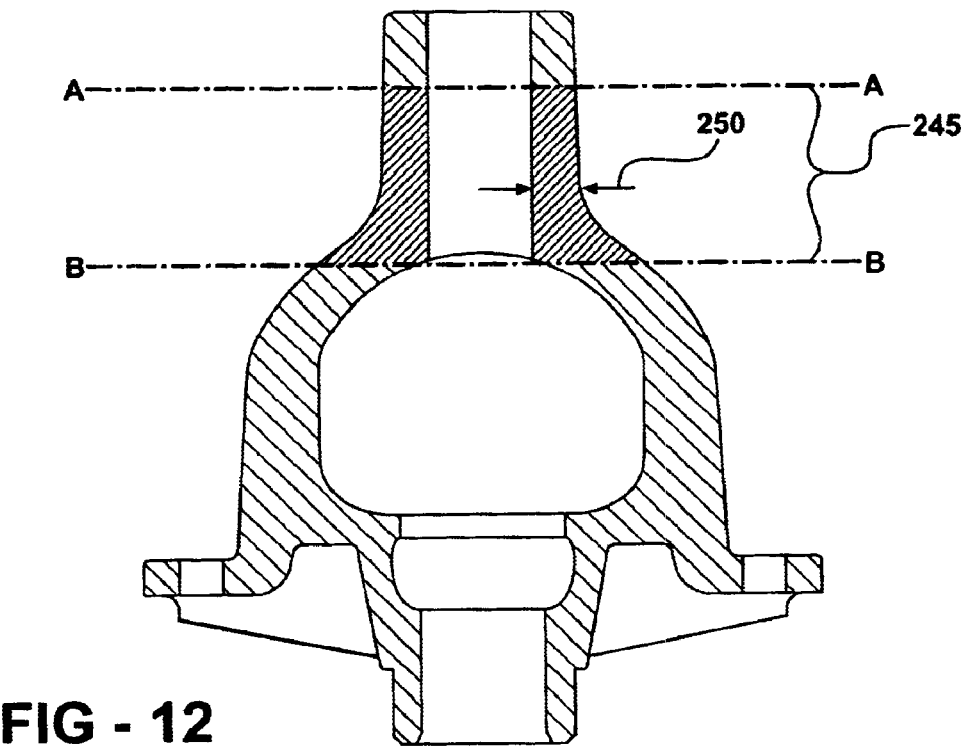
FIG. 12 is a cross-sectional view of section 12—12 of the differential housing of FIG. 3 that has been induction hardened by the method of the invention.
Figure 13:
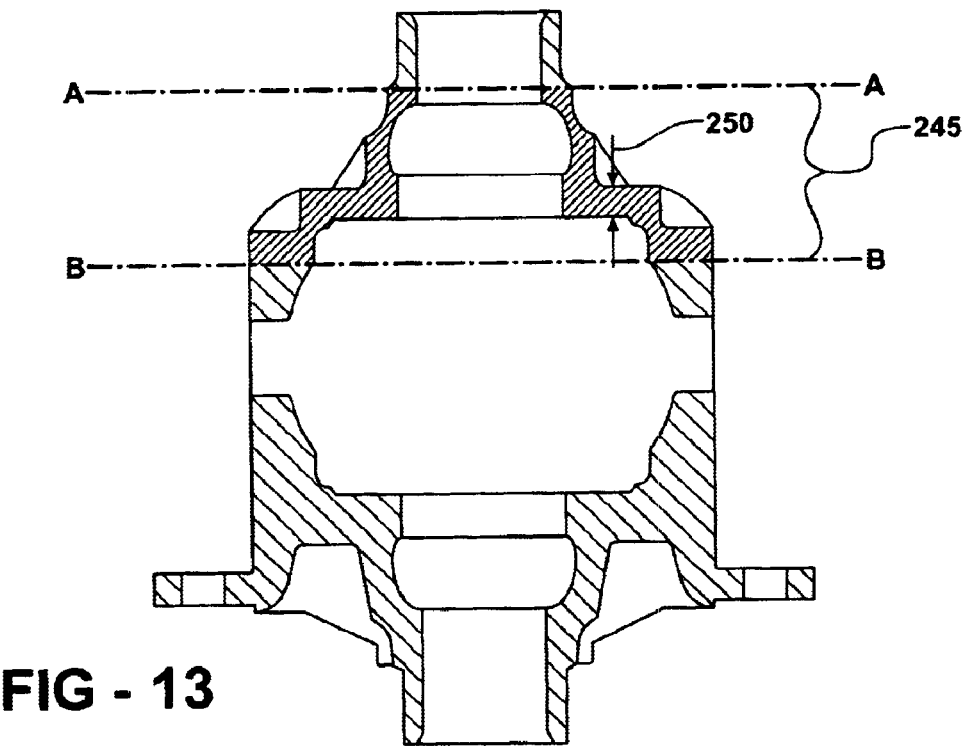
FIG. 13 is a cross-sectional view of section 13—13 of the second differential housing of FIG. 5 that has been induction hardened by the method of the invention.

Referring to FIGS. 12 and 13, following the step of cooling 60, the hardness of differential housing 200 on the surface of heat treatment portion 245 was about $R_C$ 40–50, with a hardened case 250 that extended through the thickness of metal wall 205. The microstructure comprised a martensite matrix with generally spheroidal nodules of graphite located therein. No significant solutionizing of the graphite nodules was observed.

The foregoing discussion discloses and describes an exemplary embodiment of the present invention. One skilled in the art will readily recognize from such discussion, and from the accompanying drawings and claims that various changes, modifications and variations can be made therein without departing from the true spirit and fair scope of the invention as defined by the following claims.

What is claimed is:

1. A method of induction heat treatment, comprising the steps of:

selecting an article for heat treatment comprising a metal wall having an upper hub portion, a lower hub portion, a bell-shaped portion that is located between the upper hub portion and the lower hub portion and a longitudinal axis extending through each of the upper hub portion, lower hub portion and bell-shaped portion, the bell-shaped portion having a bell-shaped outer surface, an inner surface and a plurality of windows extending from the outer surface to the inner surface;

selecting an induction coil comprising a hollow metal channel having a first termination portion, a second termination portion and a semi-rectangular inductor portion that is operably connected to the first termination portion and the second termination portion, said semi-rectangular inductor portion having a first semi-rectangular coil portion and a proportionally smaller second semi-rectangular coil portion; wherein the semi-rectangular inductor portion is adapted to receive the article and apply a plurality of magnetic fields to a heat treatment portion of the article;

placing the article within the inductor portion of the induction coil;

rotating the article within the induction coil at a selected speed;

energizing the induction coil to apply the magnetic fields and produce induction currents within the heat treatment portion of the article for a time sufficient to induce heating of the heat treatment portion to a heat treatment temperature ($T_H$) to at least a selected case depth; and cooling the heat treatment portion of the article to a temperature ($T_C$) to the selected case depth.

2. The method of claim 1, wherein the article comprises nodular cast iron.

3. The method of claim 2, wherein the heat treatment portion of the article has an austenite transition temperature, and wherein $T_H$ is greater than the austenite transition temperature.

4. The method of claim 3, wherein said step of cooling comprises quenching the article.

5. The method of claim 4, wherein the heat treatment portion of the article has a martensite transformation temperature and wherein said step of cooling comprises quenching until $T_C$ is lower than the martensite transformation temperature.

6. The method of claim 1, wherein the article comprises a differential housing.

7. The method of claim 6, wherein the differential housing comprises induction hardenable grade cast iron.

8. The method of claim 7, wherein $T_H$ is in the range of 1600–1900° F.

9. The method of claim 7, wherein said step of cooling comprises quenching the article.

10. The method of claim 1, wherein the semi-rectangular inductor portion comprises:

a semi-rectangular lower coil portion comprising a first L-shaped section having a first termination end, that is connected to the first termination portion, and a first lateral end, and an opposed second L-shaped section having a second termination end, that is connected to the second termination portion, and a second lateral end;

a semi-rectangular upper coil portion, having a first lateral end and a second lateral end, that is located above and is proportionately smaller than the lower coil portion;

a first lateral portion that connects the first lateral end of the upper coil portion to the first lateral end of the lower coil portion; and a second lateral portion that connects the second lateral end of the upper coil portion to the second lateral end of the lower coil portion, wherein during the step of energizing, the first lateral portion produces a first lateral magnetic field that is adapted to act on the heat treatment portion of the article and the second lateral coil portion produces a second lateral magnetic field that is adapted to act on the heat treatment portion of the article.

11. The method of claim 10, wherein the step of energizing comprises the application of an electric current to the induction coil having a frequency in the range of about 10 kHz.

12. A method of induction heat treatment of a heat treatment portion of a differential housing, comprising the steps of:

selecting an induction coil comprising a hollow metal channel having a first termination portion, a second termination portion and a semi-rectangular inductor portion that is operably connected to the first termination portion and the second termination portion, and said semi-rectangular inductor portion including a first semi-rectangular coil portion and a second semi-rectangular portion, said second semi-rectangular portion being approximately parallel to said first semi-rectangular portion; wherein the inductor portion is adapted to receive the differential housing and apply a plurality of magnetic fields to a heat treatment portion thereof;

placing the differential housing within the inductor portion of the induction coil;

rotating the differential housing within the induction coil at a selected speed;

energizing the induction coil to apply the magnetic fields and produce induction currents within the heat treatment portion of the differential housing for a time sufficient to induce heating of the heat treatment portion to a heat treatment temperature ($T_H$) to at least a selected case depth; and cooling the heat treatment portion of the differential housing to a temperature ($T_C$) to the selected case depth.

13. The method of claim 12, wherein the differential housing comprises nodular cast iron.

14. The method of claim 13, wherein the heat treatment portion of the differential housing has an austentite transition temperature and wherein $T_H$ is greater than the austenite transition temperature.

15. The method of claim 14, wherein $T_H$ is in the range of 1600–1900° F.

16. The method of claim 14, wherein said step of cooling comprises quenching the differential housing.

17. The method of claim 16, wherein the heat treatment portion of the differential housing has a martensite transformation temperature and wherein said step of cooling comprises quenching until $T_C$ is lower than the martensite transformation temperature.

18. A housing, comprising:

a metal wall having an upper hub portion, a lower hub portion, a bell-shaped portion that is located between the upper hub portion and the lower hub portion, a longitudinal axis extending through each of the upper hub portion, the lower hub potion and the bell-shaped portion, and a circumferential hardened case, said metal wall further including an inner surface and an outer surface and wherein the bell-shaped portion has a plurality of windows extending from the outer surface to the inner surface, the circumferential hardened case extending inwardly from the outer surface in a heat treatment portion which is located between the window and the upper hub portion, wherein the hardened case is formed by an induction heat treatment.

19. The housing of claim 18, wherein the induction heat treatment comprises the steps of:

selecting an induction coil comprising a hollow metal channel having a first termination portion, a second termination portion and a semi-rectangular inductor portion that is operably connected to the firs termination portion and the second termination portion; wherein the inductor portion is adapted to receive the article and apply a plurality of magnetic fields to a heat treatment portion thereof;

placing the article within the inductor portion of the induction coil;

rotating the article within the induction coil at a selected speed;

energizing the induction coil to apply the magnetic fields and produce induction currents within the heat treatment portion of the article for a time sufficient to induce heating of the heat treatment portion to a heat treatment temperature ($T_H$) to at least a selected case depth; and cooling the heat treatment portion of the article to a temperature ($T_C$) to the selected case depth.

20. The housing of claim 19, wherein the induction hardened case comprises a martensitic microstructure.

21. The housing of claim 20, wherein the martensitic microstructure is a tempered martensitic microstructure.

22. The housing of claim 21, wherein the tempered martensitic microstructure is formed by the induction heat treatment.

23. The housing of claim 22, wherein the tempered martensitic microstructure has a hardness of about $R_C$ 40–50.

24. The housing of claim 23, wherein the tempered martensitic microstructure extends from the outer surface to the inner surface in the heat treatment portion.

25. An induction coil, comprising:

a hollow metal channel having a first termination portion, a second termination portion and a semi-rectangular inductor portion that is operably connected to the first termination portion and the second termination portion, semi-rectangular inductor portion including a semi-rectangular lower coil portion and a semi-rectangular upper coil portion, said semi-rectangular upper coil portion being proportionally smaller than said lower semi-rectangular coil portion.

26. The induction coil of claim 25, wherein the semi-rectangular inductor portion comprises:

a first L-shaped section and an opposed second L-shaved section on said semi-rectangular lower coil portions, said first L-shaped section having a first termination end, that is connected to the first termination portion, and a first lateral end, and said second L-shaped section having a second termination end, that is connected to the second termination portion, and a second lateral end;

a first lateral end and a second lateral end on said semi-rectangular upper coil portion;

a first lateral portion that connects the first lateral end of the upper coil portion to the first lateral end of the lower coil portion; and a second lateral portion that connects the second lateral end of the upper coil portion to the second lateral end of the lower coil portion.

27. The induction coil of claim 26, wherein the hollow metal channel is rectangular having an outer width of about 10 mm and an outer height of about 10 mm and a thickness of about 1.1 mm.

28. The method of claim 12, wherein the first semi-rectangular portion is smaller than said second semi-rectangular portion.

29. The method of claim 12 wherein first semi-rectangular portion includes a first L-shaped portion having a first lateral end and opposing a second L-shaped portion having a second lateral end, said first and second L-shaped portions defining an opening between said first and second lateral ends.

* * * * *

UNITED STATES PATENT AND TRADEMARK OFFICE
CERTIFICATE OF CORRECTION

PATENT NO.    : 6,940,056 B2
DATED         : September 6, 2005
INVENTOR(S)   : Mark Christofis et al.

It is certified that error appears in the above-identified patent and that said Letters Patent is hereby corrected as shown below:

Column 8,
Line 21, "100° F." should be -- 100° F --.

Column 10,
Line 5, before "said" delete "and".
Line 47, "potion" should be -- portion --.
Line 62, "firs" should be -- first --.

Column 12,
Line 5, "L-shaved" should be -- L-shaped --.

Signed and Sealed this

Eighth Day of November, 2005

JON W. DUDAS
*Director of the United States Patent and Trademark Office*